(12) United States Patent  
Gieles

(10) Patent No.: US 7,241,238 B2
(45) Date of Patent: Jul. 10, 2007

(54) DEVICE FOR CONTROLLING CONTACT PRESSURE IN A CONTINUOUSLY VARIABLE TRANSMISSION

(75) Inventor: Wilhelmus Gieles, Wettstetten (DE)

(73) Assignee: Audi AG (DE)

( * ) Notice: Subject to any disclaimer, the term of this patent is extended or adjusted under 35 U.S.C. 154(b) by 83 days.

(21) Appl. No.: 10/464,494

(22) Filed: Jun. 19, 2003

(65) Prior Publication Data

US 2004/0259671 A1    Dec. 23, 2004

(51) Int. Cl.
*F16H 61/00* (2006.01)
(52) U.S. Cl. ...................................... 474/18
(58) Field of Classification Search ............ 474/8, 474/18, 28; 477/45, 48, 49
See application file for complete search history.

(56) References Cited

U.S. PATENT DOCUMENTS

| 3,224,287 | A | * | 12/1965 | Werner et al. ............... 474/19 |
| 4,261,213 | A | * | 4/1981 | Rattunde ..................... 476/9 |
| 5,094,652 | A | * | 3/1992 | Sakakibara et al. ........... 474/8 |
| 5,184,981 | A | * | 2/1993 | Wittke ........................ 474/19 |
| 6,190,274 | B1 | * | 2/2001 | Walter ....................... 474/28 |
| 6,336,878 | B1 | * | 1/2002 | Ehrlich et al. ............... 474/28 |
| 6,506,136 | B2 | * | 1/2003 | Schmid et al. ............... 474/18 |
| 6,669,588 | B2 | * | 12/2003 | Schmid ....................... 474/18 |
| 6,758,775 | B2 | * | 7/2004 | Heinrich et al. .............. 474/19 |

FOREIGN PATENT DOCUMENTS

| DE | 42 01 692 A1 | 8/1992 |
| DE | 196 44 030 A1 | 5/1998 |
| DE | 195 45 492 A1 | 10/1999 |
| GB | 2 331 791 | 6/1999 |

* cited by examiner

*Primary Examiner*—Vicky A. Johnson
(74) *Attorney, Agent, or Firm*—Stevens, Davis, Miller & Mosher, LLP

(57) ABSTRACT

The invention relates to a device for controlling the contact pressure of a transmission element of a continuously variable transmission, especially the traction element of a flexible drive for motor vehicles. The inventive device is provided with at least two levers as the transmission elements that provide the contact pressure depending on torque and ratio. Said levers are pivoted to the driving transmission elements and to the driven transmission elements and act upon an axially displaceable transmission element that indirectly or directly exerts the contact pressure via at least one rolling element each. The lever length effective to exert the contact pressure can be varied in accordance with the selected transmission ratio.

19 Claims, 4 Drawing Sheets

DEVICE FOR CONTROLLING CONTACT PRESSURE IN A CONTINUOUSLY VARIABLE TRANSMISSION

FIELD OF INVENTION

The invention relates to a device for controlling the contact pressure of the transmission mechanism of a continuously variable transmission.

BACKGROUND OF THE INVENTION

Such continuously variable transmissions are, for example, in the form of toroid drives or traction mechanism drives, the contact pressure of the transmission means, such as a link chain or thrust link conveyor, being controlled for the most part as a function of torque. The purpose of such transmissions is on the one hand to permit transmission of the drive torque as free of slippage as possible but on the other to counteract efficiency losses and wear resulting from application of too great a contact pressure force to the transmission means.

DE 42 01 692 A1 also discloses additional configuration of the contact pressure so that it is not dependent on the transmission ratio, for example, the contact pressure on the link chain in a traction mechanism drive being higher with a smaller effective belt contact radius on the drive side and lower with a greater belt contact radius on the drive side.

SUMMARY OF THE INVENTION

The object of the invention is to present a device for control of the contact pressure of the transmission means of a continuously variable transmission which, while being of simple and rugged design, effects continuous adjustment of the contact pressure as a function both of torque and of transmission ratio.

It is claimed for the invention that this object and other advantageous developments are attained by the characteristics specified in the claims.

While rolling elements or balls which move up corresponding frontal ramps on the driving transmission element and on the driven transmission element are used in the disclosed device for contact pressure control (see, for example, FIG. 2 of DE 42 01 692 A1 referred to above), it is proposed in accordance with the invention that use be made of levers, ones which, in accordance with the characteristics formulated in the claims, are of lengths which may be varied as a function of the moving pulley position assigned and which then act upon the transmission element bringing about the contact pressure by way of rolling elements, either additionally by way of ramps or directly without ramps.

The contact pressure control may be exerted either directly, by way of the levers and the rolling elements, or indirectly by throttle control of superimposed hydraulic contact pressure.

BRIEF DESCRIPTION OF THE DRAWINGS

Other features and advantages as well as a description of the invention will be presented below in conjunction with the diagrams presented in the accompanying drawings, in which.

DETAILED DESCRIPTION OF THE INVENTION

Figure 1:
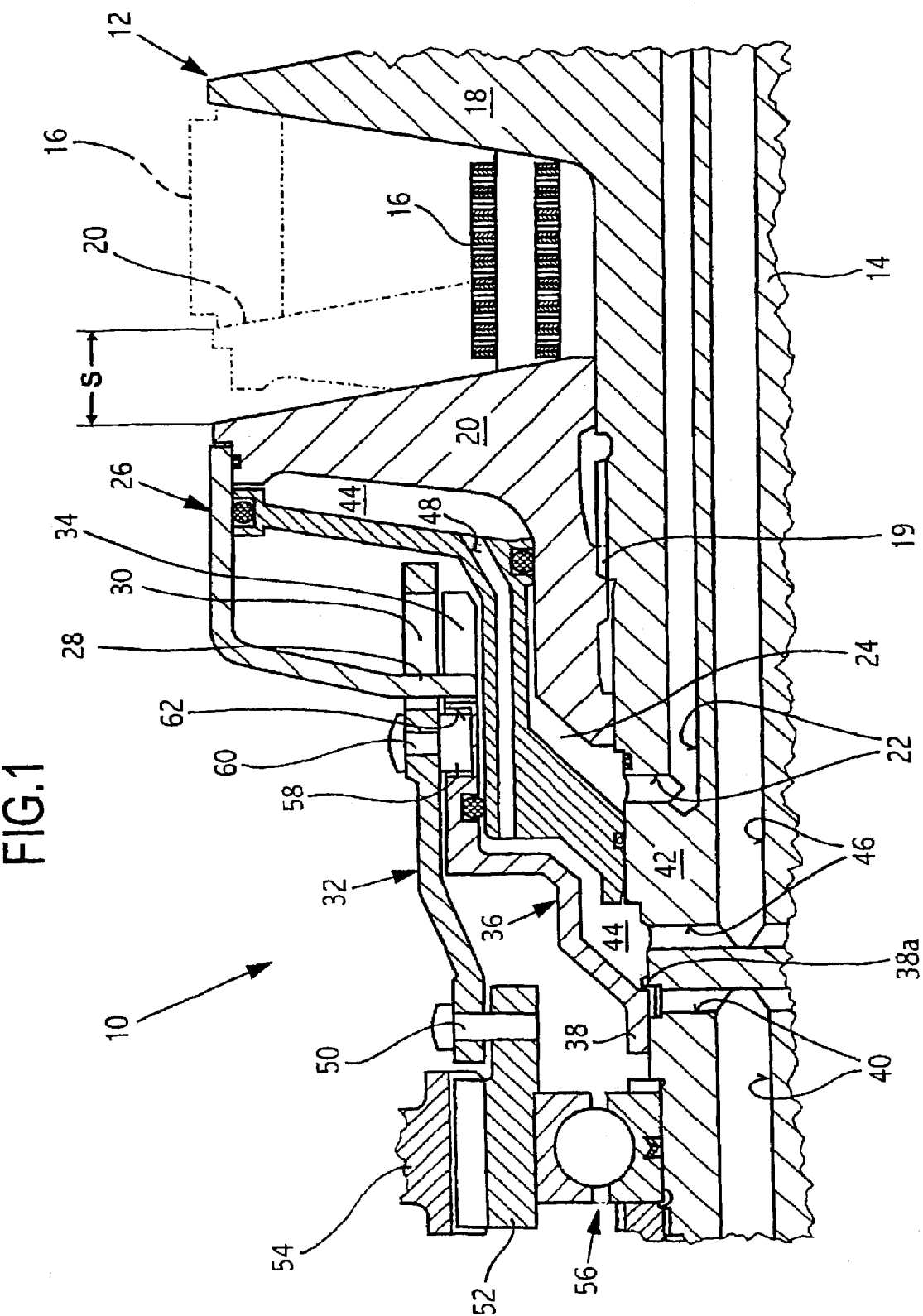
FIG. 1 presents a section of a continuously variable belt contact transmission for motor vehicles with, a pair of drive wheels shown partly in longitudinal section and a device for control of the contact pressure of the traction mechanism as a function of torque and transmission ratio.

A continuously variable belt contact transmission 10 of conventional design not thus far described is shown in a sectional view in FIG. 1; in this connection reference is to be made, for example, to FIG. 1 of DE 195 45 492 A1.

The belt contact transmission 10 has a conventional driving wheel pair 12 rotatably mounted with a drive shaft 14 in a transmission housing not shown and drives a driven wheel pair (not shown) by way of a link chain 16.

The driving wheel pair 12 (and, of course, the driven wheel pair as well) has a fixed wheel 18 and a non-rotating gearing wheel 20 which nevertheless may be moved axially by way of gearing 19; the link chain 16 may be continuously adjusted, by hydraulic adjustment of the gearing wheel 20 relative to the fixed wheel 18, within the two end positions illustrated for the purpose of assigning a desired transmission ratio. For this purpose pressurized hydraulic fluid from a hydraulic control unit not shown is delivered by way of channel 22 in the drive shaft 14 to a first hydraulic chamber 24 or drained from it.

Figure 2:
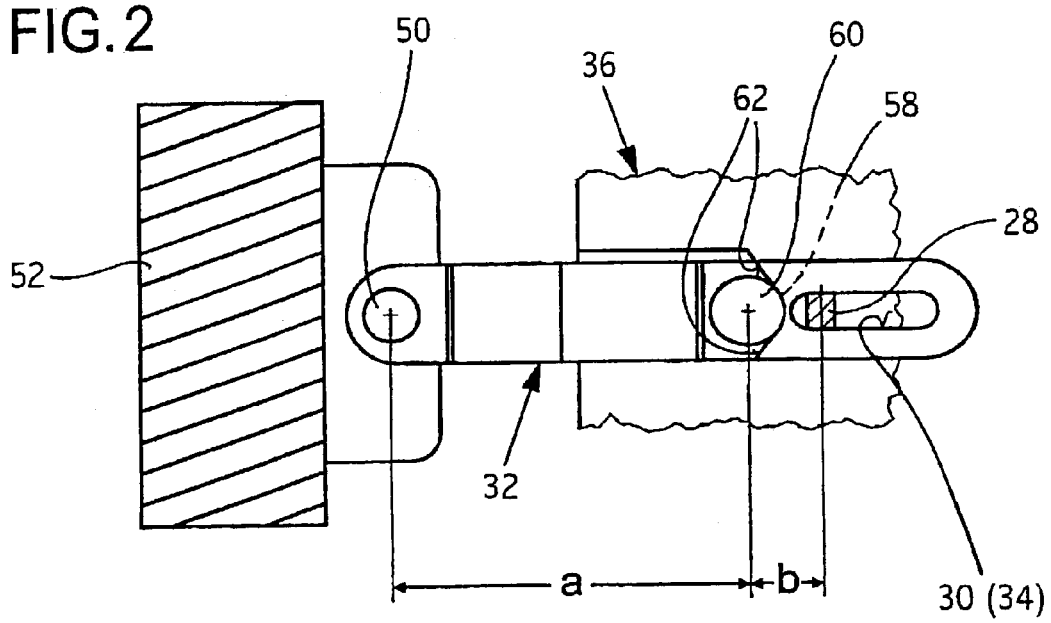
FIG. 2 a top view of the device shown in FIG. 1 with straight levers and rollers as rolling elements.

The gearing wheel 20 has non-rotatably mounted on it a drive bell 26 which pushes axially oriented sliding guides 30 by way of carriers 28 projecting inward through straight-line levers 32 (also see FIG. 2).

The carriers 28 also engage longitudinal grooves 34 of a ringshaped control sleeve 36 which is guided on the shaft 14 by a hub section (or control edge) 38b the annular edge of which forms a choke in conjunction with a drain channel 40.

Hydraulic fluid may be fed to the hydraulic chamber 44 bounded by the control sleeve 36 and an annular partition 42 rigidly connected to the shaft 14 by way of a channel 46 in the shaft 14 also connected to the hydraulic control unit and another channel 48 in the partition 42, it being possible to control the pressure (=contact pressure of the link chain 16) among other means by way of the choke 38a.

Figure 1A:
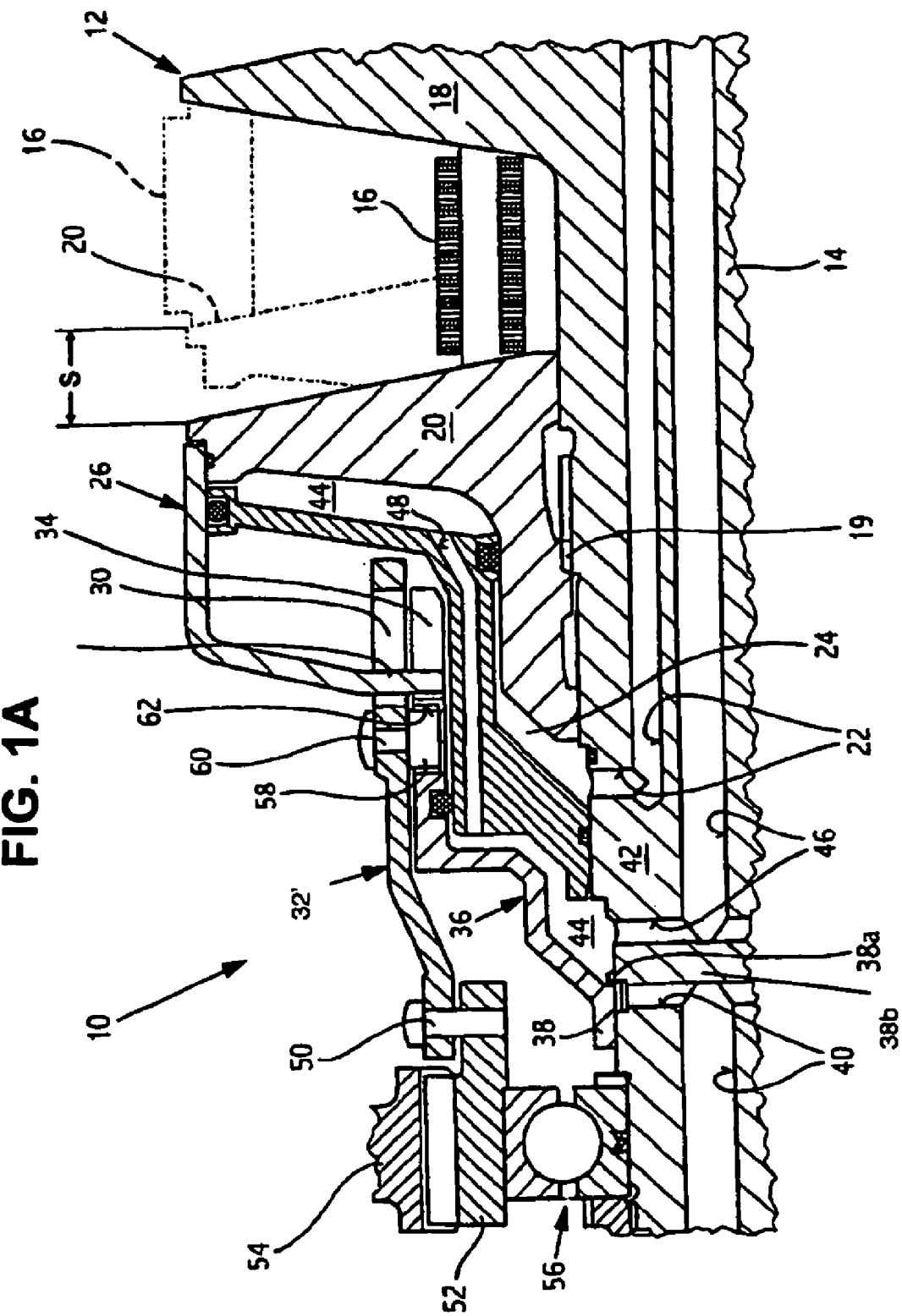
FIG. 1A presents a second section of the continuously variable belt contact transmission shown in FIG. 1.

Six levers 32 distributed over the circumference are provided, each of which is hinge connected by way of bolts 50 to a driving gear wheel 52 of the belt contact transmission 10. FIG. 1A shows a view of the structure from a different angle, showing a second lever 32'. The other transmission elements on the drive side with a gear wheel 54 on another gear shaft are not shown. The driving gear wheel 52 is rotatably mounted on the drive shaft 14 by way of a rolling bearing 56.

The levers 32 support, between the support point on the carriers 28 and the bolt connection 50, a roller 58 which is rotatably mounted on a bolt 60 of the levers 32 and operate each in conjunction with a ramp 62, the ramps 62 being formed by molding in the control sleeve 36. It is also to be noted that the carriers 28 on the drive bell 26 are guided with zero backlash in the sliding guide 30 and the control sleeve 36 and keep the control sleeve 36 nonrotatable by way of longitudinal grooves 34.

Contact pressure control of the link chain 16 by way of the gearing wheel 20 is as follows:

If driving torque is introduced by way of the driving gear wheel 52, such torque is transmitted by the six levers 32 (see FIG. 2) and by the carriers 28 to the drive bell 26 and the gearing wheel 20.

The control sleeve 36 is pretensioned to the left by the pressure of the hydraulic fluid in the hydraulic chamber 44 as shown in FIGS. 1 and 2, the ramps 62 being pressed against the rollers 58 and accordingly, because of their configuration (chamfering angle), counteract excursion of the levers 32 in both directions of rotation (=traction or thrust).

If the torque increases, the levers 32 overcome the hydraulic prestressing force and are deflected, the rollers 58 displacing the control sleeve 36 in FIG. 1 and to the right by way of the ramps 62 and guiding the control edge 38$a$ toward the drain channel 40, and accordingly throttling the latter. Because of the oil volume flow introduced, this results in increase in pressure in the hydraulic chamber 44 and so increase in the contact pressure of the link chain 16 by way of the gearing wheel 20.

Since the gearing wheel 20 and thus the drive bell 26 are displaced axially over a distance s (see FIG. 1) on change in the transmission ratio of the belt contact transmission 10, the carriers 28 also shift correspondingly relative to the levers 32 inside the longitudinal openings 30. This leads to a change in the leverage relationships from a (constant) to b (variable), lower contact pressure obviously being introduced with increase in the length of the lever b (=link chain 16 on the outside); hence the torque-dependent contact pressure decreases continuously in the event of a link chain moving outward.

Figure 3:
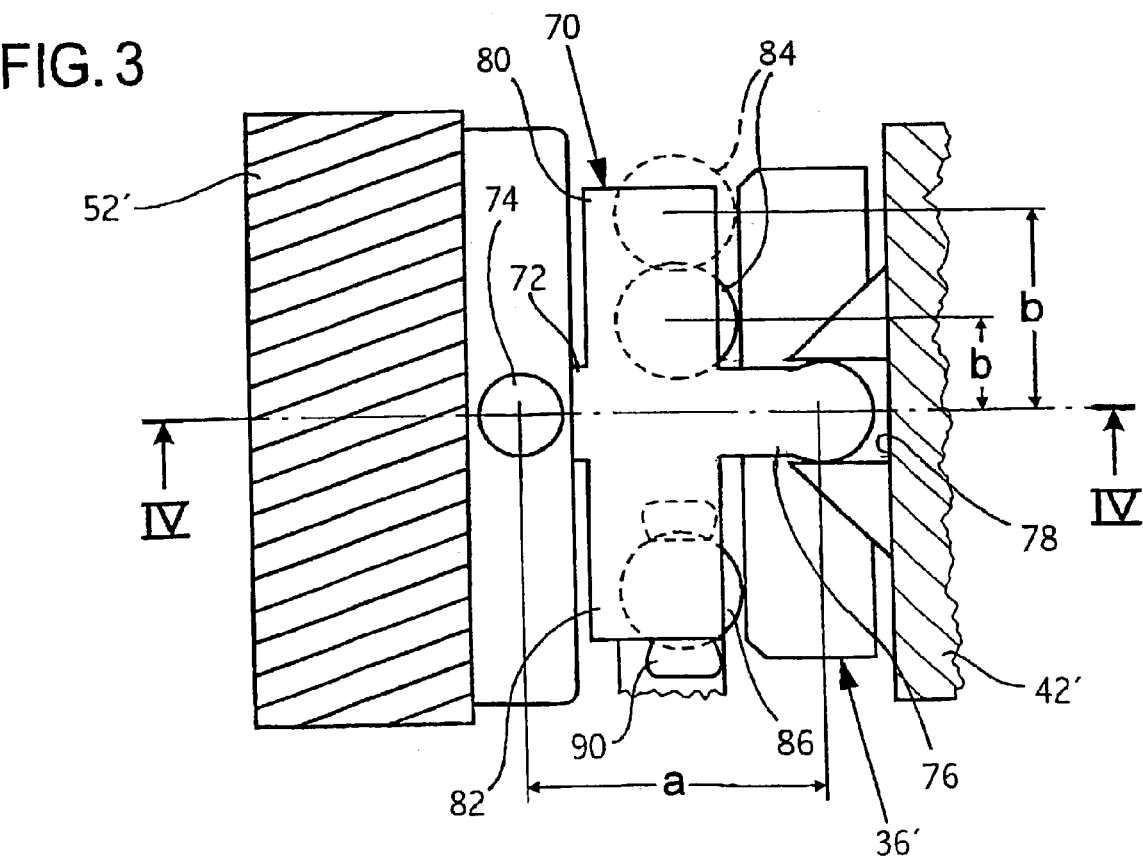
FIG. 3 also a top view, a development of another device with multiple-arm levers and balls as rolling elements.
Figure 4:
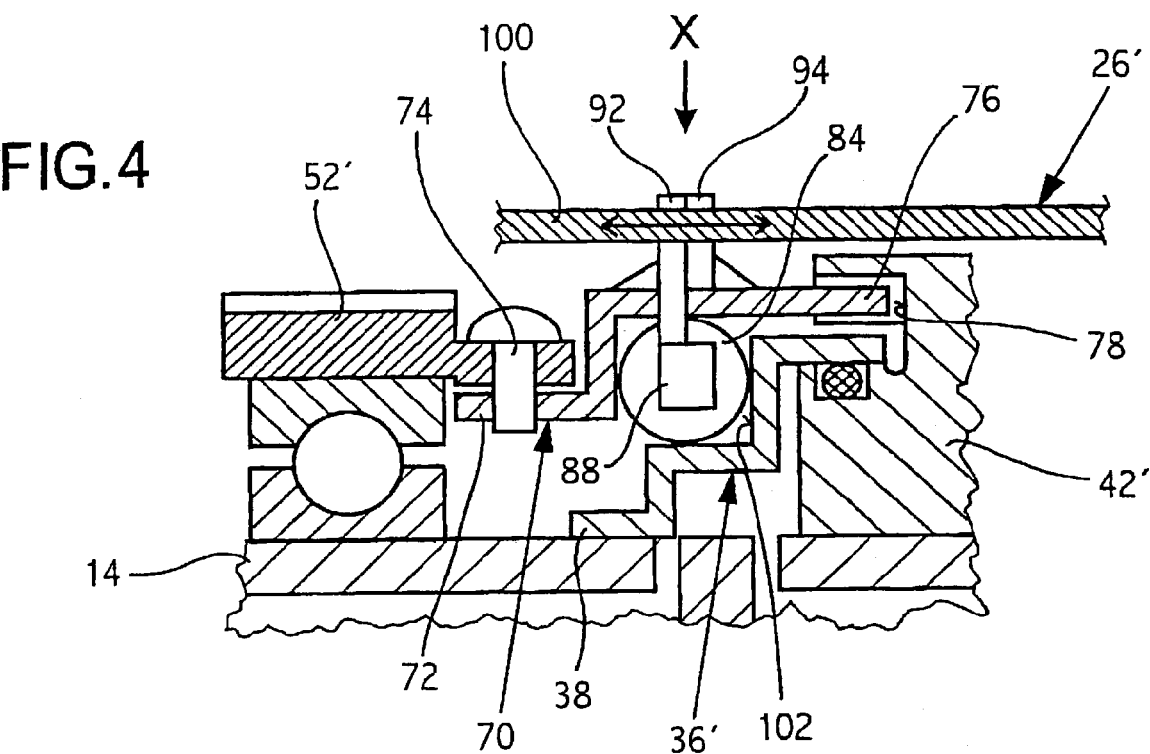
FIG. 4 a section along line IV-IV of FIG. 3 through the alternative device.

FIGS. 3 and 4 illustrate another exemplary embodiment; in order to avoid repetition, it will be described only to the extent that it differs significantly from the embodiment shown in FIGS. 1 and 2. Identical components are identified by the same reference numbers.

As is to be seen in FIGS. 3 and 4, the three levers 70 are configured in the shape of a cross; one arm 72 is coupled by means of a bolt 74 to the driving gear wheel 52', the opposite projecting arm 76 is introduced into recesses 78 in the form of pockets in the annular partition 42', and the two cross-arms 80, 82 operating in conjunction with rolling elements or balls 84, 86.

The balls 84, 86 of the three levers are guided in annular rolling bearing cages 88, 90; the bearing cages 88, 90 have radially projecting carriers 92, 94 which extend into obliquely oriented guide slots 96, 98 in an annular extension 100 on the drive bell 26'.

Figure 5:
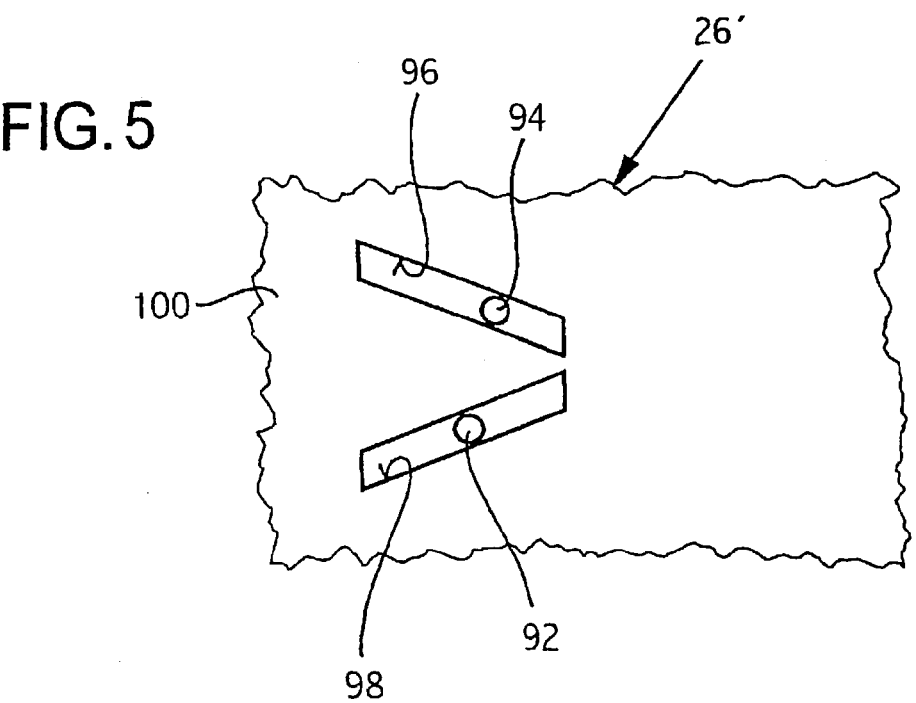
FIG. 5 a top view in the direction of arrow X in FIG. 4.

The guide slots 96, 98 per lever 70 are convergent, as is to be seen in FIG. 5, so that, on displacement of the gearing wheel 20 with drive bell 26 or 26', the rolling bearing cages 88, 90 rotate in opposite directions relative to each other by way of the carriers 92, 94, and accordingly the balls 84, 86, as is shown in FIG. 3 with reference to the balls 84, are displaced toward or away from each other and thus form the variable lever length b.

The constant lever length a results from the distance between the bolt connection 74 of the arms 72 and the point of engagement of the arms 76 of the pocket-shaped recesses 78 in the partition 42'.

The balls 84, 86 in turn act on a radial, annular stopping face 102 on the control sleeve 36'.

When drive torque is transmitted from the driving gear wheel 52' by way of the levers 70 to the partition 42' rigidly connected to the shaft, the levers 70 are rotated around the bolts 74, where the control sleeve 36' is correspondingly displaced by way of the arms 80, 82 (on application of tractive or thrust force) and the balls 84, 86. The function is as described previously in connection with FIGS. 1 and 2.

In the event of change in the transmission ratio of the belt contact transmission 10 the gearing wheel 20 is displaced with that of the drive bell 26', the rolling bearing cages 88, 90 with the balls 84, 86 being rotated in opposite directions relative to each other and the balls 84, 86 being moved toward or away from each other by way of the oblique guide slots 96, 98 and the carriers 92, 94 for the purpose of changing the lever length b.

Contact pressure control is applied by way of the control sleeve 36' in the drive direction (tractive load application) by the balls 84 and in the event of propulsive load application by the balls 86 (or conversely).

If in the event of axial displacement of the gearing wheel 20 and the drive bell 26' the rolling bearing cages 88, 90 with the balls 84, 86 are rotated so that the ball (e.g., 84) relevant in the case of drive torque is moved closer to the swivelling axis (bolt 72) of the levers 70, the hydraulic pressure application of the link chain 16 as already described in the foregoing increases as a result of reduction of the length of lever arm b (see FIG. 3). The same applies in the event of torque reversal (propulsive operation), the balls 86 operating accordingly.

The invention claimed is:

1. A variable drive transmission comprising:
   a drive shaft having a fixed pulley wall section fixedly mounted thereon, an axially displaceable pulley wall section mounted thereon, cooperable with said fixed pulley wall section to provide a drive wheel, an inlet port communicable with a source of fluid under pressure and a fluid outlet port;
   a driven wheel;
   a continuous link operatively connecting said drive and driven wheels for transmitting torque therebetween;
   a first partition fixedly mounted on said shaft and cooperating with said axially displaceable wall section and said shaft to provide a first variable volume fluid chamber, having a fluid passageway communicating with said first fluid chamber;
   a second partition mounted on said shaft for axial displacement relative thereto, cooperating with said first partition and said shaft to provide a second variable volume chamber communicating with said first variable volume chamber through said passageway in said first partition, and having a portion thereof non-obstructing said outlet port of said shaft when in a first axially disposed position and obstructing said outlet port of said shaft when in a second axially disposed position, and at least one bearing surface lying in a plane including a radius of said shaft and angularly displaced relative to a plane including the axis of said shaft;
   a gear axially mounted on said shaft, angularly displaceable relative to said shaft; and
   at least one lever mounted on said gear, having a roller disposed thereon, cooperable with said bearing surface, whereupon angular displacement of said gear, said lever shall cause said roller to engage said bearing surface to further cause said portion of said second partition to displace between said first and second positions.

2. The device as claimed in claim 1, wherein the at least one lever is rectilinear in form and connected to the gear, wherein the lever is supported on the axially mounted gear by way of a sliding guide, and wherein said roller is mounted between the gear and the sliding guide and act upon the transmission element gear applying contact pressure by way of corresponding ramps.

3. The device as claimed in claim 2, wherein said roller is rotatably mounted on the lever and wherein the corresponding ramps are formed on the axially displaceable transmission element effecting the contact pressure.

4. The device as claimed in claim 3, wherein the lever is pivot-connected to the gear by way of a bolt connection.

5. The device as claimed in claim 4, wherein the the lever has an arm projecting transversely therefrom and acts upon the gear applying contact pressure, the rolling element being circumferentially adjustable as a function of the gear position.

6. The device as claimed in claim 5, wherein the lever comprises at least one axially extending arm and at least one of the axially extending arms of the lever is engaged in frontal recesses in the axially displaceable pulley wall section.

7. The device as claimed in claim 5, wherein the rolling elements are retained in two roller bearing cages and wherein the roller bearing cages with radially projecting carriers are engaged by guide slots extending obliquely in a direction opposite a direction of adjustment of the axially displaceable pulley wall section.

8. The device as claimed in claim 7, wherein the rolling elements are balls.

9. The device as claimed in claim 8, wherein the axially displaceable pulley wall section applying contact pressure is mounted on a drive shaft so as to be axially displaceable.

10. The device as claimed in claim 2, wherein the lever is pivot-connected to the gear element by way of a bolt connection.

11. The device as claimed in claim 2, wherein the lever has an arm projecting transversely therefrom and acts upon the axially displaceable pulley wall section applying contact pressure, said roller being circumferentially adjustable as a function of the gear.

12. The device as claimed in claim 2, wherein said roller is a ball.

13. The device as claimed in claim 2, wherein the axially displaceable pulley wall section applying contact pressure is mounted on a transmission shaft so as to be axially displaceable.

14. The device as claimed in claim 1, including means providing a stationary bearing surface engaged by said lever in a manner providing a fulcrum for said lever to pivot about.

15. The device as claimed in claim 14, wherein said roller is disposed between the connection of said lever to said gear and said fulcrum.

16. The device as claimed in claim 14 wherein said lever is pivotally connected to said gear.

17. The device as claimed in claim 14 wherein said lever is provided with a longitudinally disposed opening wherein a portion of said stationary bearing surface providing said fulcrum is received.

18. The device as claimed in claim 1 including a pair of said bearing surfaces cooperable with said roller, said bearing surfaces in a plane including said radius of said shaft and angularly displaced relative to a plane including said radius.

19. The device as claimed in claim 1 wherein said displaceable pulley wall section is connected to said shaft by means of a spline connection.

* * * * *

UNITED STATES PATENT AND TRADEMARK OFFICE
CERTIFICATE OF CORRECTION

| | |
|---|---|
| PATENT NO. | : 7,241,238 B2 |
| APPLICATION NO. | : 10/464494 |
| DATED | : July 10, 2007 |
| INVENTOR(S) | : Wilhelmus Gieles |

It is certified that error appears in the above-identified patent and that said Letters Patent is hereby corrected as shown below:

On the Title page, add the following section:

Item [30] Foreign Application Priority Data
July 27, 2001 [DE] Fed. Rep. of Germany 101 36 791.0

Signed and Sealed this

Ninth Day of October, 2007

JON W. DUDAS
*Director of the United States Patent and Trademark Office*